P. J. MELTON.
MAIZE HEADER.
APPLICATION FILED NOV. 8 1916.

1,313,004.

Patented Aug. 12, 1919.
4 SHEETS—SHEET 1.

WITNESSES
Howard D. Orr.
F. T. Chapman

P. J. Melton, INVENTOR,

BY E. G. Siggers

ATTORNEY

P. J. MELTON.
MAIZE HEADER.
APPLICATION FILED NOV. 8 1916.

1,313,004.

Patented Aug. 12, 1919.
4 SHEETS—SHEET 2.

WITNESSES
Howard D. Orr.
F. T. Chapman.

P. J. Melton, INVENTOR,
BY E. G. Siggers
ATTORNEY

P. J. MELTON.
MAIZE HEADER.
APPLICATION FILED NOV. 8 1916.
1,313,004.
Patented Aug. 12, 1919.
4 SHEETS—SHEET 3.
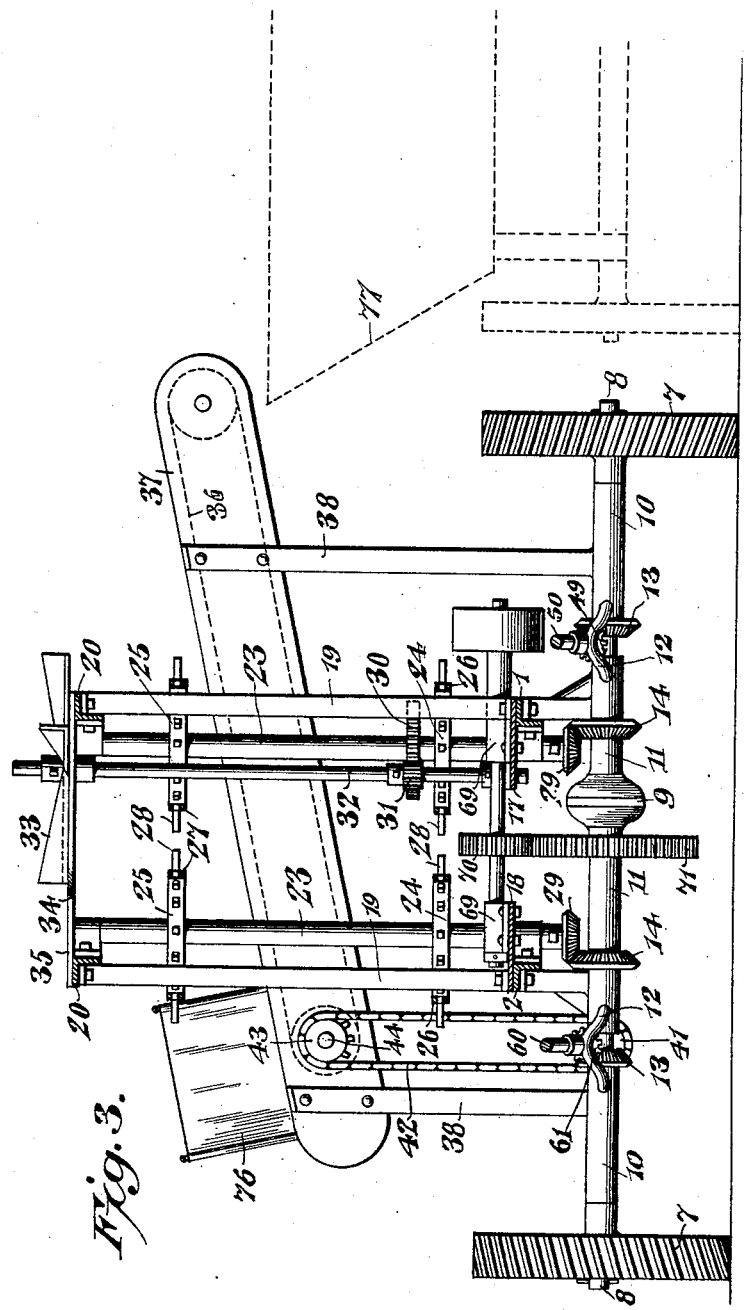
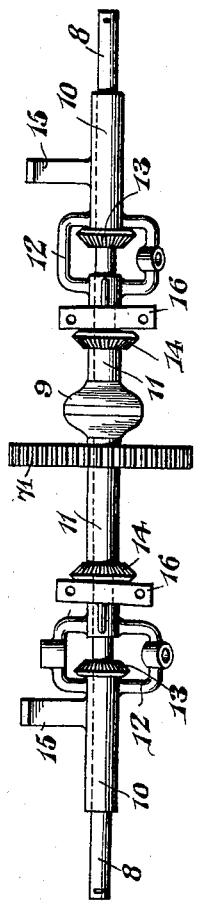
WITNESSES
Howard D. Orr.
F. T. Chapman.
P. J. Melton, INVENTOR,
BY E. G. Siggers
ATTORNEY

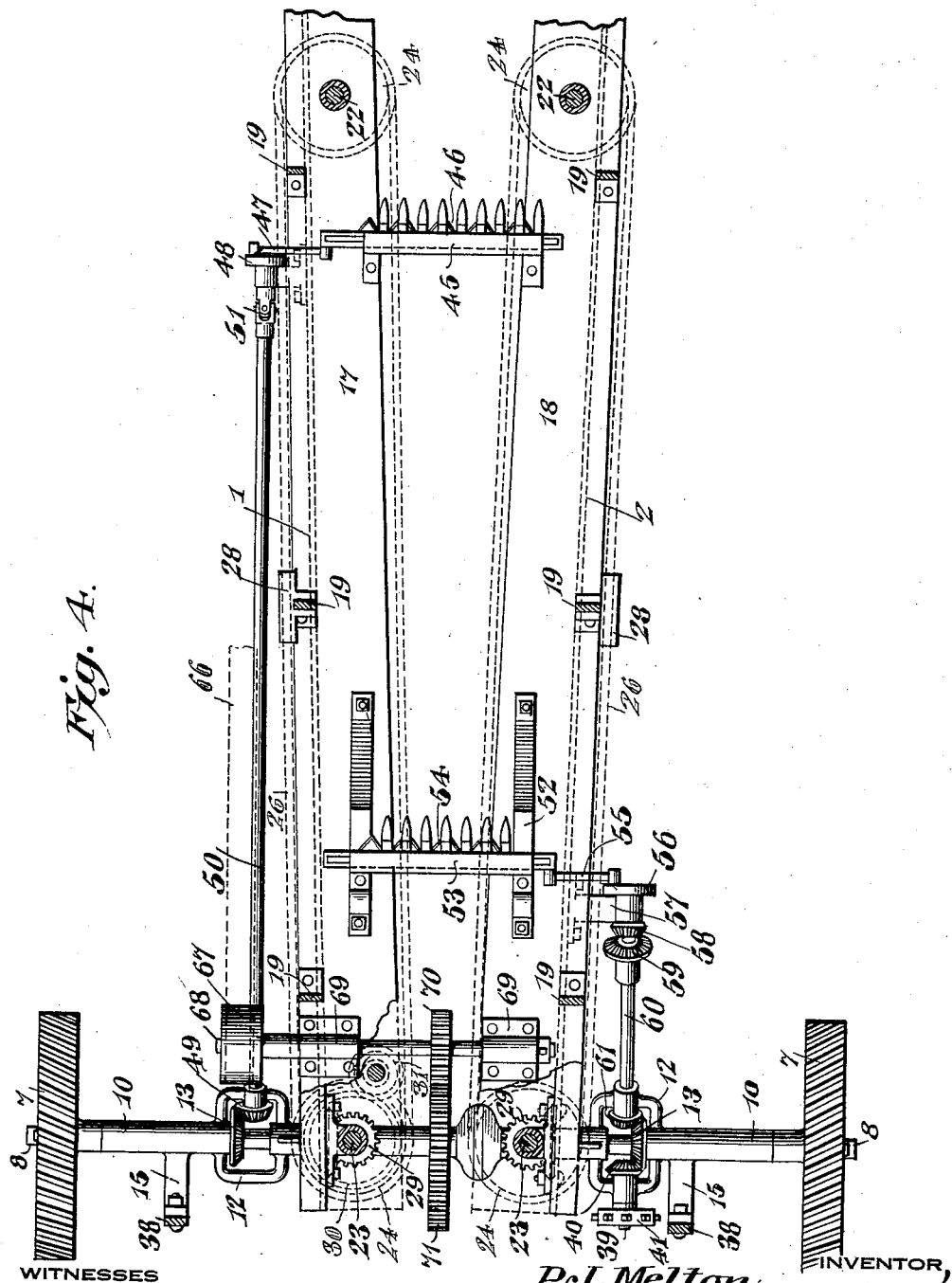

UNITED STATES PATENT OFFICE.

PINK J. MELTON, OF MEMPHIS, TEXAS.

MAIZE-HEADER.

1,313,004.　　　　　Specification of Letters Patent.　　Patented Aug. 12, 1919.

Application filed November 8, 1916. Serial No. 130,213.

*To all whom it may concern:*

Be it known that I, PINK J. MELTON, a citizen of the United States, residing at Memphis, in the county of Hall and State of Texas, have invented a new and useful Maize-Header, of which the following is a specification.

This invention has reference to headers for maize, by which term may be included different kinds of corn, and its object is to provide means whereby the heads are separated from the stalks in substantially even lengths.

The growing maize, of course, varies greatly in length of stalk. The present invention provides means whereby the stalks are cut from the root ends, then the heads are brought to substantially one level and the stalks are again cut to remove the irregular ends, and finally the heads are severed from the remainder of the stalks and deposited onto a conveyer by which they are directed into a suitable receptacle. By this means the stalks are severed into lengths susceptible of ready handling and the heads are all of substantially one length despite the fact that in growing in the field the heads are at various heights from the ground.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications come within the scope of the appended claims.

In the drawings:—

Fig. 3 is a section on the line 3—3 of Fig. 1, but drawn on a larger scale, and omitting some parts.

Fig. 4 is a section on the line 4—4 of Fig. 1, but drawn on a larger scale.

Fig. 5 is a detail plan view of the main drive shaft.

Figure 1:
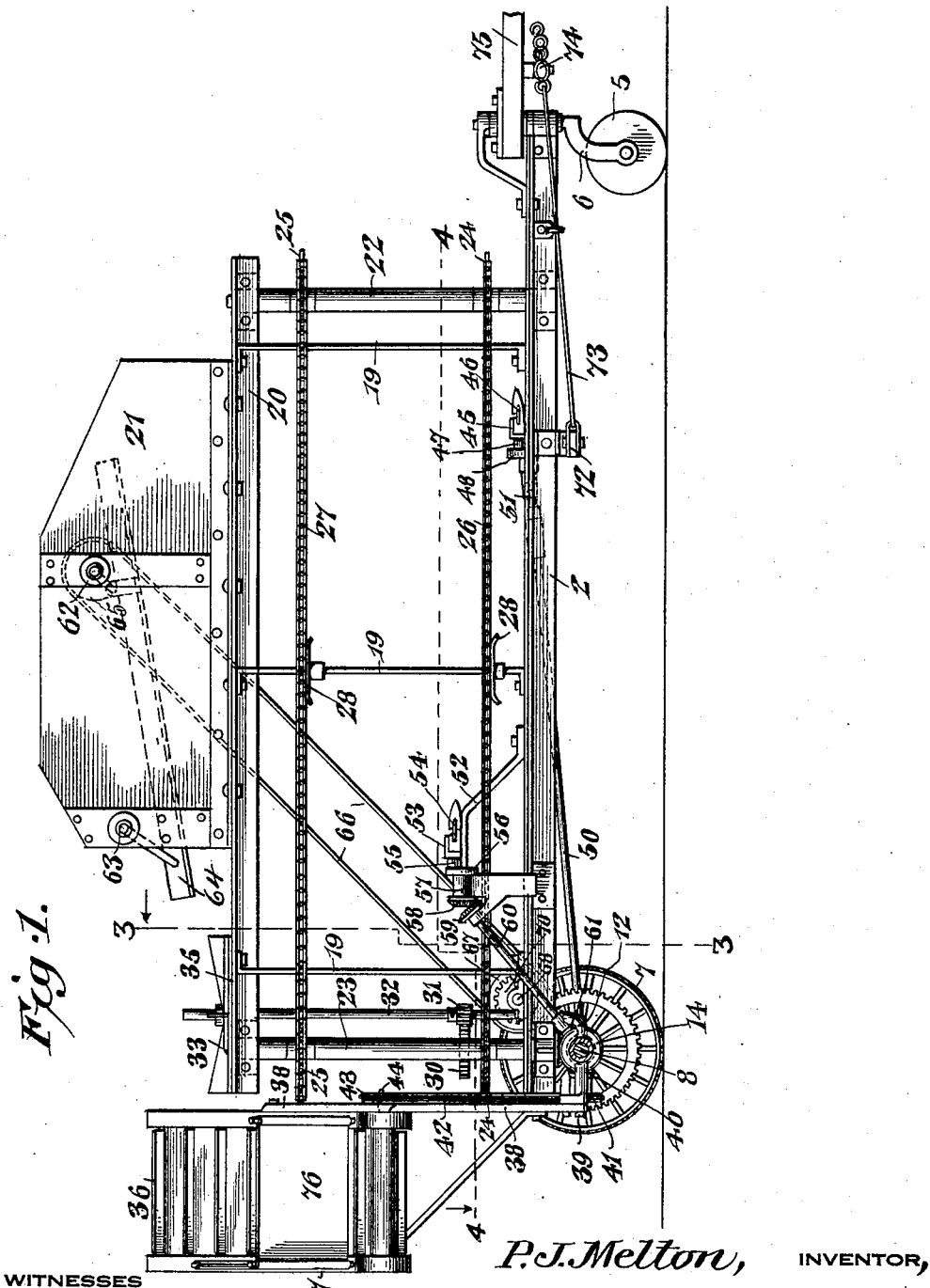
Figure 1 is a side elevation of the machine of the present invention.
Figure 2:
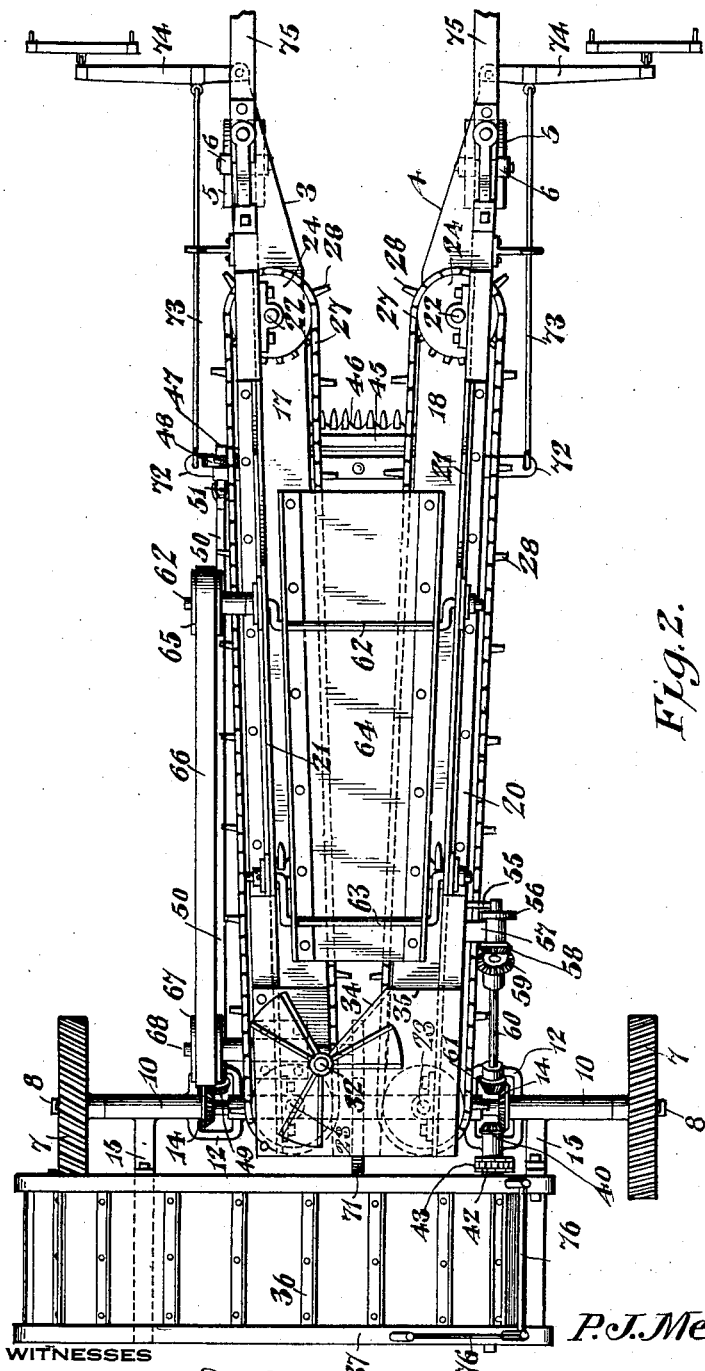
Fig. 2 is a plan view thereof.

Referring to the drawings, there is shown a vehicle having a body portion comprising longitudinal beams 1, 2 approaching from the front of the vehicle where there are divergent beveled portions 3, 4 toward the rear of the vehicle. The forward ends of the beams are supported upon wheels 5 carried by upright sustaining posts 6, the wheels being adapted to act in the nature of caster wheels.

The rear of the vehicle is carried by bull wheels 7 mounted upon axles 8 which are continued to a point near the middle of the machine where they are connected by a differential of ordinary construction simply indicated by a differential casing 9. Each axle carries sleeves 10, 11 joined together and separated at adjacent ends by yokes 12 through which the axle sections extend. Each axle carries bevel pinions 13, 14 for a purpose which will hereinafter appear. The sleeves 10 have brackets 15 thereon and the sleeves 11 have other brackets 16 thereon. It is by means of the brackets 16 that the rear axle is made fast to the beams 1 and 2 which latter may be of angle metal construction and have fast to their top surfaces respective plates 17, 18 forming part of the beams and on which the beveled portions 3 and 4 are formed. The adjacent edges of the plates 17 and 18 are close enough together and approach one another toward the rear to constitute a gathering throat through which the maize is directed as the vehicle moves forwardly.

Erected on the beams 1 and 2 or upon the plates 17 and 18 are posts 19 carrying other beams 20 at their upper ends approaching toward the rear end of the vehicle like the beams 1 and 2. Mounted on the beams 20 are side plates 21 rising to an appropriate height and approaching toward the rear ends like the beams 20.

Mounted on the beams 1, 2 and 20 and extending between them are upright shafts 22, 23 carrying sprocket wheels 24, 25 near their ends, the sprocket wheels 24 being arranged a short distance above the beams 1 and 2 and the sprocket wheels 25 being arranged a short distance below the beams 20. The shafts 22 are located near the front ends of the beams 1 and 2, and the shafts 23 are located near the rear ends of the beams and consequently near the rear end of the vehicle. Extending between the sprocket wheels 24 on the shafts 22 and 23 are sprocket chains 26 and extending between the sprocket wheels 25 on the shafts 22 and 23 are sprocket chains 27. Both of these chains carry fingers 28 and have runs extending into the guiding space or throat between the plates 17 and 18, so as to engage and propel the stalks directed into such guiding throat by the beveled portions 3, 4. The chains 26 and 27 extend lengthwise of the machine and in order to keep these chains from sagging certain of the uprights 19 carry supports 28 over which the corresponding runs of the chains pass.

The shafts 23 carry bevel gears 29 at their lower ends meshing with the gears 14 on the respective shafts 8 and one of the shafts 23 is provided with a gear wheel 30 meshing with the pinion 31 and upright shaft 32 suitably journaled on the beam 1 and rising above the corresponding beam 20 where it carries a rotary cutter 33 in coactive relation to a cutter blade 34 at the rear end of the guiding space between the plates 17 and 18. The cutter 34 forms part of a plate 35 delivering at its rear end upon the conveyer 36, which may be of ordinary construction mounted in a conveyer frame 37 carried by uprights 38 fast to the brackets 15. In order to drive the conveyer a stub shaft 39 is mounted in an appropriate one of the yokes 12 and carries at one end a beveled pinion 40 meshing with the appropriate bevel pinion 13 on one of the shafts 8. The stub shaft 39 also carries a sprocket wheel 41 at the end remote from the pinion 40, which sprocket wheel is connected by a sprocket chain 42 to another sprocket wheel 43 on a shaft 44 carried by the frame 37 and driving the conveyer 36.

Near the front of the machine and carried by the plates 17 and 18 is a support 45 for a cutter blade 46 which may be of the ordinary reciprocatory type connected by a pitman 47 to a wrist pin disk 48. An appropriate one of the bevel gears 13 is engaged by a bevel gear 49 on one end of a shaft 50 connected to the wrist pin disk 48 and, since in the particular construction shown, the axis of the wrist pin disk 48 is somewhat out of alinement with the shaft 50, the shaft and disk are connected by a universal joint 51.

At a point near the rear of the machine the plates 17 and 18 carry supports 52 for a frame 53 carrying a reciprocatory cutter 54 like the cutter 46 but at a higher level. The cutter 54 is driven by a pitman 55 connected to a wrist pin disk 56 on a stub shaft carried by a bracket 57 fast to the beam 2 and rising to an appropriate height. At the rear end of the stub shaft remote from the disk 56 there is a bevel pinion 58 engaged by another bevel pinion 59 on a shaft 60 supported near one end by the bracket 57 and at the other end journaled in an appropriate one of the yokes 12 and there carrying a bevel pinion 61 meshing with an appropriate one of the bevel gears 13. In this way both cutters 46 and 54 are driven by the bull wheels 7 through the shafts 8 while the cutter 33 is also driven from the same source of power.

Extending between the plates 21 above the beams 20 is a crank shaft 62 and at a suitable distance from the shaft 62 the plates 21 have journaled in them another crank shaft 63 which, however, does not rotate, but is mounted to rock and has a radially longer crank portion than the shaft 62. The crank portions of the shafts 62 and 63 carry a leveler plate 64 near the opposite ends of the latter, the plate being located between the side plates 21. On the shaft 62 is a pulley 65 connected by a belt 66 to another pulley 67 on a shaft 68 mounted in suitable bearings 69 on the plates 17 and 18 near their rear ends back of the cutter 54. The shaft 68 carries a pinion 70 meshing with the gear wheel 71 on one of the shafts 8.

Carried by the beams 1 and 2 at a point about coincident with the cutter frame 45 but beneath the latter is a rocker bar 72 connected at opposite ends to rods 73 which at their front ends are connected to draft rigging 74 so that draft animals may be used to draw the machine. No attempt is made to show any particular type of draft rigging as any suitable form may be employed. At the front end of the beams 1 and 2 are continuations 75 constituting gatherers and these continuations may extend as far forwardly as may be desired.

When the machine is in use it is drawn along by suitable power so that the stalks are directed into the throat formed by the beveled portions 3 and 4 and bunched into the guideway between the plates 17 and 18, being there engaged by the fingers 28 on the adjacent runs of the sprocket chains 26 and 27, these runs moving rearwardly as the machine is moved forwardly. The stalks are first engaged and severed by the cutter 46 and are then supported by the chains 26 and 27 between which the stalks have been directed. As the stalks move rearwardly with reference to the machine, the heads are brought under the plate 64 to which is imparted an up and down movement by the crank shaft 62 and rock shaft 63. The result is that in passing beneath the plate 64 the heads of the stalks are all brought to a common level, those of a certain height being affected but little by the plate 64, while others are depressed to a considerable extent, the stalks being correspondingly lowered until the heads are all at about one level. The lower ends of the stalks when first severed by the cutter 46 are on a level, but when the heads are brought under the plate 64 and depressed thereby, the lower ends of the stalks are as much out of level with each other as the heads previously were. When the stalks reach the cutter 54, their lower ends are again severed at a higher point than before, and the stalks with the heads thereon are all brought to substantially the same length, with the lower ends sufficiently high to escape engagement with mechanisms further back on the machine. The plate 64 is inclined and this helps in the matter of depressing the stalks until the heads are all at about one level. On leaving the plate 64, the stalks immediately beneath the heads are engaged by the cutter 33 and the heads are severed to be directed by the blades of the cutter 33 onto the conveyer 36 which latter is provided with a guard 76 adjacent to the end upon which the heads are delivered. The conveyer 36 is a rising conveyer and discharges from its higher end into any suitable receptacle, such for instance as a wagon 77, indicated in dotted lines in Fig. 3, which wagon may move along with the vehicle. The stalks which are severed from the heads are all of substantially the same length, this being advantageous for some purposes.

What is claimed is:—

1. A header for maize and the like comprising a vehicle, means for engaging and holding the stalks, means on the vehicle for severing the stalks from the root ends thereof, means on the vehicle for then depressing the head ends of the stalks to bring them all to approximately one level, means on the vehicle for severing the butt ends of the depressed stalks and located at a higher level than the first severing means, and means on the vehicle for then severing the leveled heads from the stalks.

2. A header for maize and the like comprising a vehicle having means for severing the stalks from the root ends, means for depressing the head ends of the stalks to bring all the head ends to substantially a common level, and means for then severing the head ends from the stalks.

3. A header for maize and the like comprising a vehicle, means for gathering the stalks into a path of restricted width, means for severing the stalks from the root ends thereof, means for then bringing the head ends of the stalks to an approximately common level, other severing means for the stalks at a higher level than the first-named severing means and located to sever the lower ends of the stalks after the head ends have been leveled, and other severing means to the rear of the second-named severing means in the direction of travel and at a higher level than said second-named severing means, for removing the heads from the stalks.

4. A machine for heading maize and the like comprising a vehicle having an elongated passageway open at the front and provided with gathering means for directing the stalks of maize into the passageway, traveling gathering means for engaging and holding the stalks in the passageway, a cutter at a relatively low level and located near the entrance of the passageway for severing the stalks from the root ends, a depressor for engaging the heads of the maize after severance of the stalks from the root ends for bringing the head ends to an approximately common level, and means adjacent to the rear end of the leveler for severing the heads from the stalks whereby the severed heads are of approximately one length.

5. A machine for heading maize and the like comprising a vehicle having an elongated passageway open at the front and provided with gathering means for directing the stalks of maize into the passageway, traveling gathering means for engaging and holding the stalks in the passageway, a cutter at a relatively low level and located near the entrance of the passageway for severing the stalks from the root ends, a depressor for engaging the heads of the maize after severance of the stalks from the root ends for bringing the head ends to an approximately common level, and means adjacent to the rear end of the leveler for severing the heads from the stalks whereby the severed heads are of approximately one length, the machine also including severing means at a lower level than the second-named severing means and positioned to engage the stalks before reaching the second-named severing means whereby the lower ends of the stalks are removed before the head ends of the stalks are removed.

6. In a header for maize and the like, means for gathering the maize into a restricted path through the machine, means on the machine for severing the gathered stalks from the root ends, a reciprocatory beater structure having an up and down movement and positioned to engage the head ends of the stalks for approximately leveling the head ends, and means on the machine for severing the leveled head ends from the remainder of the stalks.

7. In a header for maize and the like, means for gathering the maize into a restricted path through the machine, means on the machine for severing the gathered stalks from the root ends, a reciprocatory beater structure having an up and down movement and positioned to engage the head ends of the stalks for approximately leveling the head ends, and means on the machine for severing the leveled head ends from the remainder of the stalks, said beater means being in the form of a plate higher at the forward end than at the rear end.

8. In a header for maize and the like, means for gathering the maize into a restricted path through the machine, means on the machine for severing the gathered stalks from the root ends, a reciprocatory beater structure having an up and down movement and positioned to engage the head ends of the stalks for approximately leveling the head ends, and means on the machine for severing the leveled head ends from the remainder of the stalks, said beater means being in the form of a plate higher at the forward end than at the rear end, and means for reciprocating the plate comprisnig a crank shaft carrying the forward end of the plate, another crank shaft of greater radial length than the first crank shaft for rocking movement and carrying the rear end of the plate, and means for rotating the first-named crank shaft.

9. In a header for maize and the like, means for gathering the maize into a restricted path through the machine, means on the machine for severing the gathered stalks from the root ends, a reciprocatory beater structure having an up and down movement and positioned to engage the head ends of the stalks for approximately leveling the head ends, and means on the machine for severing the leveled head ends from the remainder of the stalks, said beater means being in the form of a plate higher at the forward end than at the rear end, and means for reciprocating the plate comprising a crank shaft carrying the forward end of the plate, another crank shaft of greater radial length than the first crank shaft for rocking movement and carrying the rear end of the plate, and means for rotating the first-named crank shaft, said plate having associated therewith side plates for preventing lateral spreading of the leveled heads.

10. A header for maize and the like comprising a vehicle with a gatherer adapted to engage the stalks of the maize, cutters arranged one behind the other for severing the stalks of the maize with the rear cutter at a higher level than the front cutter, means for depressing high-standing stalks to bring the heads of the stalks into approximately one level before reaching the second cutter, and means for severing the leveled heads from the stalks.

11. A header for maize and the like comprising a vehicle with a gatherer adapted to engage the stalks of the maize, cutters arranged one behind the other for severing the stalks of the maize with the rear cutter at a higher level than the front cutter, means for depressing high-standing stalks to bring the heads of the stalks into approximately one level before reaching the second cutter, and means for severing the leveled heads from the stalks, the machine being also provided with a conveyer associated with the last-named severing means for receiving the severed heads and conveying them to a point of disposal.

In testimony that I claim the foregoing as my own I have hereto affixed my signature in the presence of two witnesses.

PINK J. MELTON.

Witnesses:
  M. O. GOODPASTURE,
  T. M. DISHEROON.

Copies of this patent may be obtained for five cents each, by addressing the "Commissioner of Patents, Washington, D. C."